Patented July 11, 1933

1,917,676

UNITED STATES PATENT OFFICE

HUGO WERTHEIM, OF VIENNA, AUSTRIA

PROCESS FOR THE SIMULTANEOUS PRODUCTION OF BUTYL ALCOHOL AND ACETONE BY FERMENTATION

No Drawing. Application filed February 13, 1930, Serial No. 428,234, and in Austria February 23, 1929.

The subject of the invention is the production of butyl alcohol and acetone by the fermentation of carbohydrates with the aid of bacteria of the species *B. amylobacter A.M. and Bredemann* (Zentralblatt für Bakteriologie Sec. II, 1909, vol. 23, p. 385) which have been immunized, by cultivation, to increasing amounts of acid. The above mentioned species has been named by the Society of American Bacteriologists; "*Clostridium butyricum Prazmowski*" (Bergey, page 320).

Fernbach having established that butyl alcohol and acetone are obtainable as the main product, together with small amounts of other alcohols, by fermenting carbohydrates, or substances containing same, with ferments of the *B. butylicus Fitz* type, under anaerobic conditions, this process rapidly attained high industrial importance in the United States of America. The originating substances may consist either of amylaceous or of saccharine natural raw materials, since the bacteria setting up the bacterial butyl-acetonic fermentation can readily degrade starch to monosaccharides by enzymatic action. All the bacteria hitherto employed produce butyl alcohol and acetone in the fixed proportion of 2 to 1. The yield of "solvents" ranges between 21 and 25%, referred to dry maize. In addition, carbon dioxide and hydrogen occur as gaseous products of fermentation.

The evolution of this type of fermentation up to the present state of the art has been particularly facilitated by the discovery that, in order to obtain uniformly vigorous fermentations, it is necessary to start with cultures which contain no vegetative forms of growth, but only spores. Accordingly, the cultures employed for pitching, are heated to about 95° C. for a short time. It has also transpired that the acids resulting from the fermentation must not be neutralized with chalk. On the contrary, it is essential to the regular progress of the fermentation that the acidity should steadily increase at the outset, up to a maximum ("peak"), and later, during fermentation, steadily diminish until fermentation ceases. The curve of fermentation has developed into an important means of supervising the operation. If the acidity decreases very slowly, or not at all, this is an indication that the mashes are infected, or that the cultures have become enfeebled. The carbohydrate content of the mash is substantially lower than the concentrations permissible in the case of alcoholic fermentation, 8% of starch being specified as the upper limit. The organisms producing the acetone-butyl alcoholic fermentation are therefore more sensitive than yeast to the products of their own metabolism. Despite the low concentration, the viscosity of the mashes, which are prepared by steaming the originating materials under pressure, is considerable (especially when maize meal is employed), in consequence of which it has been proposed to effect this boiling under pressure with an addition of such restricted amounts of hydrochloric acid as are just sufficient to transform the diphosphates of the meal into monophosphates. Finally, it was already recommended by Fernbach that, if necessary, dissociated, or partially degraded yeast should be added, as a nutrient substance, to the carbohydrate mash.

In addition to these suggested measures, of greater or minor importance to the technical development of the process, mention has been made, particularly in the patent literature, of various organisms which are credited with the possession of specific properties in relation to the process. Thus, Weizmann recommends the use of heat-resisting bacteria—including those found in the soil or on field crops—which liquefy gelatine and transform the greater portion of the starch in maize or other cereals into a mixture of acetone and butyl alcohol, under aerobic or anaerobic conditions, without the joint employment of yeast or the like. Others have believed they have discovered special kinds of micro-organisms—which they have described and named—for this purpose. It has, however, been assumed, and to some extent demonstrated, by prominent workers, that these organisms merely differ in name, and all belong to the species *Bacillus amylobacter A.M. and Bredemann*, inasmuch as any morphological and physiological variations observed are solely due to the influence of the different nutrient media and methods of culture employed. As a matter of fact, we have succeeded, by means of experiments extending over some years, in influencing the properties of *B. amylobacter A.M. and Bredemann*, by a special culture method, in such a way as to render it capable, under suitable conditions, of completely fermenting starch and other carbohydrates, and with the known result that, in addition to the gaseous fermentation products (carbon dioxide and hydrogen), a mixture of normal butyl alcohol and acetone, in the ratio of 2 to 1, is obtained, together with small amounts of other alcohols.

The subject of the invention consists, in the first place, of this special culture method, which is based on the circumstance that all the organisms—irrespective of the names they have received—which set up the acetone-butyl alcoholic fermentation, are extremely sensitive to acids, inasmuch as, when grown in acid nutrient media, they degenerate, become asporogenic and finally perish. The object of the invention is to lessen the sensitiveness of this type of ferments towards free acid by gradual habituation. The process devised for the purpose of realizing this inventional idea consists substantially in continuing to cultivate the *Bacillus A.M.* and *Bredemann* on nutrient media with progressively increasing initial acidity, and without neutralizing the acid produced by the fermentation, until the organism has become acidproof to the desired extent, whilst between each two successive cultivations on such a nutrient medium (hereinafter termed "habituating fermentations") there is interposed a fermentation in a neutral or alkaline medium (hereinafter termed "sporulation fermentations"), in which fermentations the acid formed is neutralized; the cultures being heated for a short time, in the usual way, prior to inoculation of the next habituating fermentation with higher initial acidity, in order to kill all the vegetative forms, so that spores alone are subcultivated in the habituating fermentations.

According to a preferred method of carrying out the invention, the nutrient medium of the habituating fermentations is buffered in order that, despite the increase in the acid during fermentation, the hydrogen-ion concentration will be prevented from exceeding certain limits, the degree $\pi$ to which the buffering of the nutrient media is carried in the successive habituating fermentations being raised in accordance with the higher initial acidity. The mixtures of weak acids with their alkali salts (see Michaelis's work on "Hydrogen Ion Concentration", page 37, et seq. and page 89 et seq.) are particularly suitable for buffering.

The buffering index $\pi$ (to which Michaelis, Hydrogen Ion Concentration, 1926 edition, page 106, assigns the symbol $v$) is expressed mathematically by the equation value $$\frac{dA}{dpH}$$

As is known, the numerical value of the buffering is determined by measuring the change occurring in the pH on addition of a definite small amount of acid or alkali to a given amount of culture medium. Theoretically, the additions should be infinitely small, but in practice the lower limit is set by the accuracy of the method of pH determination. In order to obtain comparable measurements the amount of acid (alkali) added must be constant in all the experiments. The $\pi$ values given below are based on the following known method of determination. Three 1 cc. samples of the fermentation medium are taken simultaneously, and the pH value is determined in one of them by the usual method. The second sample is treated with 0.5 cc. of $n/100$ $H_2SO_4$, and the third with 0.5 cc. of $n/100$ NaOH; whereupon the pH value is also determined in each of them by the same method. The changes in the pH value are in indirect proportion to the buffering value $\pi$. Theoretically, these changes should be of equal value, with opposite signs but in practice, the changes produced in the pH value by equivalent amounts of acid and alkali often differ considerably. In the practical determination, after having fixed the changes of pH towards the acid and the alkaline sides the arithmetical mean of the reciprocal values is calculated and accepted as $\pi$. The known indicator-strip method of Dr. Peter Wulff (see German Patent No. 405,091) was employed for determining the pH value.

By employing this method of determination, the buffer index of the nutrient media in the successive habituating fermentations is controlled so that it gradually increases from about 4 at the commencement of the series of cultures. At the same time, it has been found highly advantageous to employ in conjunction, for buffering the fermentation medium, mixtures of substances which are active in this sense and are of the same kind—for example malt germs, killed and preferably degraded yeast, urea, ammonium phosphate or the like—as those afterwards added to serve as nitrogenous nutriment in the main fermentations of the carbohydrate originating materials. The effect of this measure is that the micro-organism becomes habituated to increasing amounts of such nitrogenous nutrient additions at the same time as it becomes habituated to increased amounts of acid.

Organic acids, preferably lactic acid, are the best for acidifying the nutrient media of these habituating fermentations. The most favorable results are obtained when the initial acidity of the fermentation medium in the successive habituating fermentations is allowed to increase (with $\pi=4$) from 0.1 to 0.6. (Here and subsequently, the acidity is expressed by the number of cc. of $n$-caustic soda required to neutralize 100 cc. of the medium, bromthymol blue being employed as indicator). With the rise in the acidity and the buffer index, the concentration of the nutrient medium in carbohydrates may also be steadily increased in the successive habituating fermentations. It is preferable to commence with nutrient media containing 1% of carbohydrate (calculated as starch), and terminate with a carbohydrate content of 6–8%.

The nutrient medium of varying composition employed for the habituating fermentations may contain, for example, potatoes, maize meal or rice meal, as the originating carbohydrate material. The nitrogenous buffering mixtures contain, for example, malt sprouts (malt germs) or autolyzed yeast, urea or ammonium phosphate, or ammonium sulphate, in various combinations. The nutrient medium for the sporulation fermentations is of uniform composition and consists, for example of 100 parts by weight of potato pulp, 100 parts by weight of water, 10 parts by weight of malt sprouts or blood, and 2 parts by weight of chalk ($CaCO_3$). Both these nutrient media are placed in test glasses and thrice fractionally sterilized. The bacillus is either collected from the soil or field crops, in the manner specified by Bredemann and isolated as pure cultures (loc. cit., p. 390 et seq.); or spores of various strains of *B. amylobacter A.M. and Bredemann* are taken from existing cultures. These organisms are first grown for 24 hours on the sporulation nutrient media, and then, after being heated at about 90° C., for 5 minutes or so, are used to inoculate the nutrient medium of the first habituating fermentation. After fermenting, for 48 hours, the cultures are examined, in respect of their bacteriological, morphological and physiological properties, in the usual way. Such of the organisms as appear most suitable are then allowed to ferment the sporulation nutrient medium a second time, and after the vegetative forms have been destroyed, are transferred to the suitably prepared nutrient medium of the second habituating fermentation. All the fermentations are conducted under completely anaerobic conditions and at 37–38° C. This method of alternating habituation—and sporulation fermentations is continued until a test fermentation shows that the organism is capable of fermenting a mash containing 6–8% of starch—which mash has been adjusted to a titratable acidity of 1.4–1.6 by addition of acid, and (with an initial buffer index of at least 4) exhibits a pH of 5–4.7—until the carbohydrates have completely disappeared; that is to say, that neither sugar nor starch is detectable in the fermentation medium at the close of fermentation. (Since the cultures liberate copious amounts of gas, the flasks employed for this test fermentation should be provided with suitable plugs, permeable to gas, as is usual in cultivating anaerobic organisms.) This end is attained only after a very long series of habituating fermentations but without the operator being restricted to the choice of initially morphologically different strains of *B. amylobacter A.M. and Bredemann.*

However, the application of this method in series of more than a hundred habituation fermentations, has resulted in the isolation of two strains of this species—which have been designated *Bacillus amylobacter W.* and *Bacillus amylobacter S.*—particularly adapted for producing the buty–acetonic fermentation. Morphologically, the sole difference between the vegetative forms of these two stocks consists in that the *Bacillus amylobacter W.* forms longer rods, whilst the vegetative forms of the other stock are less slender. In the sporulation stage, the plectridium forms predominate in the case of *amylobacter W.*, and the clostridium forms in the case of the other stock. The oidium forms of both organisms are actively motile. Both stocks exert no liquefactive action on gelatine, and are obligatory anaerobic, in which respects they form a contrast to the bacteria recommended by Weizmann.

For carrying out the fermentation on a large scale, cultures containing spores exclusively are propagated in progressively larger batches—according to the usual practice—until finally a setting on portion of sufficient size for pitching the main mash will be built up.

The mashes for the large-scale fermentation are also prepared in the usual manner. The optimum concentration in starch or sugar is 6–7%.

Differing from the known practice, however, the main fermentation is conducted, according to the invention, in mashes which are acidulated, previous to fermentation, by the addition, or fermentative production, of organic acids, especially lactic acid. The main mash is also preferably treated with an addition of efficient buffering mixtures, which also represent nitrogenous nutrient substances, such as albuminaceous mixtures of vegetable origin, together with ammonium compounds, especially ammonium salts or urea.

It has been found advisable to adjust the initial acidity of the main mash (titratable acidity towards bromthymol blue) to at least 1.4–1.6°. With a buffer index of at least 4, the pH value should be between 5 and 4.6. In conjunction therewith, the rule has been established, for controlling the working operations, to supervise the course of fermentation not only by bacteriological examination and the determination of the acidity curve, but also by periodically measuring the buffer index, the $\pi$ value being modified to suit the change in the acidity, that is to say, so as to increase with the latter, and preferably attain its highest value simultaneously with the maximum acidity. If the buffer index is found to be insufficiently high, it should be remedied by the addition of substances of high buffering power, such as salts of lactic acid, tartaric acid, citric acid or oxalic acid, during the course of the main fermentation. In this manner, the reduced sensitiveness of the ferments towards acids, by means of the above described habituating fermentation, is utilized to assure the purity of the main fermentation in a hitherto unattainable manner, combined with the uniform attainment of maximum yields. Given these working conditions, maximum acidities of 8-9° are reached at the culmination of the main fermentation. Consequently, the organisms which have been immunized to the presence of acids also produce, in the course of the fermentation, larger amounts of acid than have hitherto been observed in butyl-acetonic fermentation.

*Example*

100 litres of the mash should contain about 35 to 37 kg. of potatoes or 9 to 10 kg. of maize meal. Other starch-bearing materials are made up into mashes of identical concentration (6 to 7% of pure starch) according to the amount of starch they contain. The potatoes are used whole, maize or the like in the form of meal, each of these two materials being introduced, with suitable amounts of water, into an autoclave, fitted with stirrers, where they are steamed about 1 to 2 hours under a pressure of 2 to 3 atmospheres. The nitrogenous nutrient substances (killed or autolyzed yeast or malt germs in conjunction with urea, ammonium phosphate or ammonium sulphate, or similar nitrogenous substances in various combinations) which serve at the same time as buffer are preferably added to the mash while in the autoclave. Typical suitable quantities of such additions comprise, per 100 litres of mash, 125 grms. of killed or degraded yeast, 125 grms. of malt germs and 40 grms. of ammonium sulphate. The mash is blown directly into previously sterilized fermentation vessels, which are hermetically closed and provided with agitating means and with a top adapted to collect the liberated gas. After being adjusted to the suitable initial acidity of 1.4 to 1.6 c. c. normal NaOH per 100 c. c.—for which purpose 80 to 90 c. c. of 80% lactic acid may be added to each 100 litres of the mash—the mash is cooled—for example, by means of internally disposed cooling devices—to the fermentation temperature of 37 to 38° C. For this purpose, however, it may also be run through a serially disposed heat-exchanging apparatus. The mash shows now a pH value between 5 and 4.6 and a buffer index of at least 4.

When the mash is ready for pitching, a suitable quantity of the bacterial pitching material must also be ready for use. This is prepared by heating a culture of *Bacterium amylobacter W.* or *S.*, at about 90° C. for a short time, and employing it so to inoculate 100 cc. of sterile carbohydrate mash prepared in about the same manner as the main mash, and allowing the organism to develop therein at 37 to 38° C., under anaerobic conditions. The growth and development of the oidia commences at the end of about 48 hours. When the culture has been found to be of unimpeachable character, it is used to inoculate about 2 litres of a similar sterilized mash, and after about 24 hours is transferred to about 20 litres of a similar mash. At the end of another 24 hours, these 20 litres are introduced into 200-300 litres of a prepared mash which, after a further 24 hours are transferred to the main mash which has been prepared in the meantime.

During the main fermentation, the pH and buffer index—in addition to the bacterial examination and the titratable acidity—are determined at least four times a day, further buffering substances being then added, if necessary. After fermentation has proceeded for about 30 to 32 hours, during which period the fermenting mass must be carefully stirred at intervals, the culminating point of the fermentation—and therewith the maximum acidity (up to 8-9%)—is attained. With the assistance of the highly buffered state of the mash, the organisms immunized to the presence of acid are able to stand this high acidity without becoming enfeebled. By the end of about 48 hours the fermentation will be complete, that is to say, no more starch or sugar is practically detectable in the mash.

After the fermentation is terminated, the resulting main products (butyl alcohol and acetone) are recovered by fractional distillation in the usual manner. Owing to their small amount, the separate recovery of the other alcohols does not seem to be economical.

The gases, hydrogen and carbon dioxide, liberated during the fermentation, and also the residues containing valuable feeding stuffs, can be utilized in the customary manner.

It has already been proposed to habituate the bacteria employed for butyl-acetonic fermentation to certain mash constitutents, which give rise to sluggish fermentation, so as to bring said ferments into a condition for preventing the occurrence of this epidemic trouble. On carefully filtering the mash through a bacterium filter, these substances are still not eliminated and the ultramicroscopic character of the causes of sluggish fermentation is also concluded for other reasons. Consequently it is assumed that this case is a matter of immunizing the organisms to an invisible virus or a bacteriophage. It is also known to subject the cultures to one or more selective processes, by cultivating them in a nutrient solution containing small amounts of the products which are to be obtained through the fermentation. The point in this case is to render the ferments resistant towards acetone or butyl alcohol. The only feature displayed by the process of the present invention in common with these two suggestions is the known bacteriological method of habituating micro-organisms to certain substances by repeated cultivation in presence of such substances.

The establishment of certain conditions with respect to the titratable acidity, the pH value and the buffering of the mash as described and claimed in the present application is valuable also independently from the use of bacteria which have been habituated, by cultivation, to increasing amounts of acids and from the special culture method forming the subject matter of the present invention. This independent process constitutes the subject matter of my copending application Serial No. 428,235 filed February 13, 1930.

I claim:

1. A process for the manufacture of butyl alcohal and acetone characterized by habituating bacteria of the species *Amylobacter A.M. and Bredemann*, by cultivation, to increasing amounts of acid, and fermenting carbohydrate material by means of the so immunized bacteria to produce mainly butyl alcohol and acetone.

2. A process for the manufacture of butyl alcohol and acetone which comprises habituating bacteria of the species *Amylobacter A.M. and Bredemann*, by cultivation, to increasing amounts of acid, preparing a sterile carbohydrate mash, acidulating the said mash before initiating fermentation, inoculating it with the said bacteria immunized to the presence of acids, permitting the fermentation to go to completion and recovering butyl alcohol and acetone from the fermented mash.

3. A process for the manufacture of butyl alcohol and acetone which comprises habituating bacteria of the species *Amylobacter A.M. and Bredemann*, by cultivation, to increasing amounts of acid, preparing a sterile carbohydrate mash, adjusting the hydrogen ion concentration of the said mash, by addition of an organic acid, to a pH of less than 5, inoculating it with the said bacteria immunized to the presence of acids, permitting the fermentation to go to completion and recovering butyl alcohol and acetone from the fermented mash.

4. A process for the manufacture of butyl alcohol and acetone which comprises habituating bacteria of the species *Amylobacter A.M. and Bredemann*, by cultivation, to increasing amounts of acid, preparing a sterile carbohydrate mash, acidulating the said mash before initiating fermentation by means of lactic acid, inoculating it with the said bacteria immunized to the presence of acids, permitting the fermentation to go to completion and recovering butyl alcohol and acetone from the fermented mash.

5. A process for the manufacture of butyl alcohol and acetone which comprises habituating bacteria of the species *Amylobacter A.M. and Bredemann*, by cultivation, to increasing amounts of acid, preparing a sterile carbohydrate mash, acidulating the said mash before initiating fermentation by fermentative generation of lactic acid, inoculating it with the said bacteria immunized to the presence of acids, permitting the fermentation to go to completion and recovering butyl alcohol and acetone from the fermented mash.

6. A process for the manufacture of butyl alcohol and acetone which comprises habituating bacteria of the species *Amylobacter A.M. and Bredemann*, by cultivation, to increasing amounts of acid, preparing a sterile carbohydrate mash, adding an acid until the titratable initial acidity determined with bromthymol blue as indicator is adjusted to 1.4 to 1.6 c. c. normal NaOH per 100 c. c. of the mash at the minimum, inoculating the mash with the said bacteria immunized to the presence of acids, permitting the fermentation to go to completion and recovering butyl alcohol and acetone from the fermented mash.

7. A process for the production of butyl alcohol and acetone by fermentation which comprises preparing a sterile acidulated carbohydrate mash, adjusting the pH thereof to between 5 to 4.6 and the buffer index to at least 4, by adding buffering mixtures thereto, inoculating said mash with butyl-acetonic bacilli immunized to the presence of acids, permitting the fermentation to go to completion and recovering butyl alcohol and acetone from the fermented mash.

8. A process for the manufacture of butyl alcohol and acetone which comprises habituating bacteria of the species *Amylobacter A.M. and Bredemann*, by cultivation, to increasing amounts of acid, preparing a sterile carbohydrate mash, adjusting the hydrogen ion concentration of the said mash, by addition of an acid, to a pH of less than 5, whilst adjusting the buffer index to at least 4 by adding buffering mixtures thereto which serve at the same time as nitrogenous nutriment, inoculating the mash with the said bacteria immunized to the presence of acids, permitting the fermentation to go to completion and recovering butyl alcohol and acetone from the fermented mash.

9. A process for the production of butyl alcohol and acetone by fermentation which comprises preparing a sterile acidulated carbohydrate mash, the initial titratable acidity of which mash (determined by using brom-thymol blue as indicator) is at least 1.4 to 1.6, c. c. normal NaOH per 100 c. c. of the mash, adjusting the pH thereof to between 5 to 4.6 and the buffer index to at least 4 by adding. buffering mixtures thereto inoculating said mash with butyl-acetonic bacilli immunized to the presence of acids, permitting the fermentation to go to completion and recovering butyl alcohol and acetone from the fermented mash.

10. A process for producing butyl alcohol and acetone which comprises habituating bacteria of the species *Amylobacter A.M. and Bredemann*, by cultivation, to increasing amounts of acid, preparing a sterile carbohydrate mash, adding buffering mixtures thereto, inoculating said mash with the said bacteria immunized to the presence of acids, modifying during fermentation the buffer index by further additions of buffering substances so as to suit the changes in titratable acidity, permitting the fermentation to go to completion and recovering butyl alcohol and acetone from the fermented mash.

11. In a process as claimed in claim 10 the step which consists in modifying the $\pi$ value, by means of further added buffering substances, to suit the variation in the titratable acidity so as to attain its highest value with the maximum acidity.

12. A process for producing a culture of butyl-acetonic bacilli immunized to the presence of acids which comprises cultivating bacteria of the species *Amylobacter A.M. and Bredemann* in a series of habituating fermentations on nutrient media of increasing initial acidity without neutralization of the acids formed during fermentation, with interposition between each two successive habituating fermentations of a sporulation fermentation in a non-acid medium with neutralization of the acids formed during the fermentation.

13. A process for producing a culture of butyl-acetonic bacilli immunized to the presence of acids which comprises cultivating bacteria of the species *Amylobacter A.M. and Bredemann* in a series of habituating fermentations on nutrient media of increasing initial acidity without neutralization of the acids formed during fermentation, with interposition between each two successive habituating fermentations of a sporulation fermentation in a non-acid medium with neutralization of the acids formed during the fermentation, the cultures being heated for a short time to eliminate vegetative forms of growth, prior to being used for inoculating the medium of higher acidity for the next habituating fermantation, in each case.

14. A process for producing a culture of butyl-acetonic bacilli immunized to the presence of acids, which process consists in cultivating said bacilli in a series of fermentations on carbohydrate media containing increasing amounts of acid, and restricting the increase in the hydrogen ion concentration during the fermentation by buffering the nutrient media.

15. A process for producing a culture of butyl-acetonic bacilli immunized to the presence of acids, which process consists in cultivating said bacilli in a series of fermentations on carbohydrate media containing increasing amounts of acid, and restricting the increase in the hydrogen ion concentration during the fermentation by buffering the nutrient media, the buffering index $\pi$ being increased in the successive fermentations with the increasing initial acidity.

16. In a process as set forth in claim 14 the step of effecting the buffering of the fermentation media with mixtures of substances capable of exercising a buffering action and being of the same kind as those which, on preparing a carbohydrate main mash to be inoculated with the produced culture of immunized butyl-acetonic bacilli, are used as nitrogeneous additions to the carbohydrate materials.

17. A step in the process for producing a culture of butyl-acetonic bacilli immunized to the presence of acids by repeatedly sub-cultivating said bacilli in buffered carbohydrate media containing increasing amounts of acid, which step consists in increasing the initial acidity of the fermentation medium in the successive fermentations from 0.1 to 1.6 c. c. normal NaOH per 100 c. c. of the mash, the buffering index $\pi$ being 4.

18. A step in the process for producing a culture of butyl-acetonic bacilli immunized to the presence of acids by repeatedly sub-cultivating said bacilli in buffered carbohydrate media containing increasing amounts of acid, which step consists in allowing the carbohydrate concentration of the nutrient medium to increase steadily from one habituating fermentation to the other.

19. A step in the process for producing a culture of butyl-acetonic bacilli immunized to the presence of acids by repeatedly sub-cultivating said bacilli in buffered carbohydrate media containing increasing amounts of acid, which step consists in allowing the carbohydrate concentration of the nutrient medium to increase steadily from one habituating fermentation to the other, the initial concentration being 1% of carbohydrate (calculated as starch) and the final concentration 6% to 8%.

In testimony whereof I have affixed my signature.

HUGO WERTHEIM.